United States Patent [19]

Ueno et al.

[11] Patent Number: 4,542,203
[45] Date of Patent: Sep. 17, 1985

[54] METHOD FOR PRODUCING BRANCHED AROMATIC POLYESTERS

[75] Inventors: Katsuji Ueno, Hirakata; Hiroaki Sugimoto, Takatsuki; Kazuo Hayatsu, Ibaraki, all of Japan

[73] Assignee: Sumitomo Chemical Company, Limited, Osaka, Japan

[21] Appl. No.: 636,017

[22] Filed: Jul. 30, 1984

Related U.S. Application Data

[63] Continuation-in-part of Ser. No. 559,270, Dec. 8, 1983, abandoned.

[30] Foreign Application Priority Data

Dec. 27, 1982 [JP] Japan ................. 57-231290

[51] Int. Cl.$^4$ ................. C08G 63/06; C08G 63/60
[52] U.S. Cl. ................. 528/126; 528/125; 528/128; 528/173; 528/176; 528/190; 528/193; 528/271
[58] Field of Search ............... 528/176, 193, 190, 125, 528/126, 128, 173, 271

[56] References Cited

U.S. PATENT DOCUMENTS 3,772,250 11/1973 Economy et al. ................. 528/193
3,857,814 12/1974 Economy et al. ................. 528/193
4,417,043 11/1983 Cogswell et al. ................. 528/193

FOREIGN PATENT DOCUMENTS 0052927 6/1982 European Pat. Off. .

Primary Examiner—Lester L. Lee
Attorney, Agent, or Firm—Stevens, Davis, Miller & Mosher

[57] ABSTRACT

In a method for producing aromatic polyesters having improved moldability by the polycondensation of A: one or more compounds selected from the group consisting of aromatic hydroxycarboxylic acids and their functional derivatives such as acylated or esterified compounds thereof, or A with B: one or more compounds selected from the group consisting of aromatic dicarboxylic acids and their functional derivatives such as esterified compounds or acid halides thereof and C: one or more compounds selected from the group consisting of aromatic diphenols and their functional derivatives such as acylated compounds thereof, the improvement comprising adding to the reaction system, either in bulk, or gradually during polycondensation D: one or more compounds selected from the group consisting of 1,3,5-trihydroxybenzene, 3,5-dihydroxybenzoic acid, 5-hydroxyisophthalic acid and their functional derivatives such as acylated or esterified compounds thereof, whereby D is included in the reaction.

5 Claims, No Drawings

METHOD FOR PRODUCING BRANCHED AROMATIC POLYESTERS

CROSS REFERENCE TO THE RELATED APPLICATION

The present application is a continuation-in-part of application Ser. No. 559,270, filed Dec. 8, 1983 and now abandoned.

The present invention relates to a method for producing aromatic polyesters having excellent moldability as well as balanced properties.

Aromatic polyesters have excellent properties based on structure, and excel all other resins, particularly, in thermal resistance. Particularly, aromatic polyesters which are formed with p-hydroxybenzoic acid or its derivatives as a central component, can be used for compression molding, transfer molding, extrusion molding, injection molding, etc. and are superior in mechanical and electrical properties as well as thermal resistance and thermal stability, so that they are used in various fields such as machine parts, electric/electronic parts, automobile parts, tablewares, etc.

But, the aromatic polyesters have problems in that the molding condition is severe because of the polymers excellent thermal resistance, and that deterioration and coloration of polymer occur because the molding temperature is high. Consequently, an improvement in the moldability has been demanded.

Further, aromatic polyesters like these easily orient in molding of large shear, for example, in injection molding, so that there are found problems such that: A difference in percent shrinkage on molding is produced between the machine direction (MD) and the transverse direction (TD), the anisotropy of mechanical strength is large, and when the molded product has a welded part, the strength of the part is low.

In order to solve the aforementioned problems inherent to the aromatic polyesters, i.e. poor moldability and anisotropy on molding, various methods have so far been used. In order to improve the moldability, there is a method of blending the polyesters with a resin of better flowability (good moldability), for example a method of blending with polyethylene terephthalate, polycarbonate, etc., followed by molding.

But, in a case wherein the aforementioned aromatic polyesters formed with p-hydroxybenzoic acid or its derivative as a central component, for example those which are obtained from p-hydroxybenzoic acid, terephthalic acid, isophthalic acid, 4,4'-dihydroxydiphenyl, etc., is mixed with polyethylene terephthalate and polycarbonate, followed by granulation and molding, when these steps are carried out in the temperature region in which said aromatic polyester is uniformalized, polyethylene terephthalate and polycarbonate inferior in thermal stability in this region are subject to thermal decomposition. When these steps are carried out in the temperature region in which these resins are stably uniformalized, the whole system of the composition does not a uniform dispersion because of the insufficient flowability of the aromatic polyester. For uniformalizing the whole system, prolonging the residence time of the resin at every step is also possible, but the system is far a uniform dispersion. Also, for bringing the system to such state, long periods of time are required, which is not practical.

As another method, an improvement in moldability and a reduction in anisotropy can also be achieved by introducing an aliphatic group such as ethylene glycol unit into the structure of the aromatic polyester, thereby decreasing the intermolecular cohesive force. In most cases, however, this brings about a reduction in thermal property which results in damaging the excellent property of the aromatic polyester.

In view of the present situation, the applicants have undertaken studies in order to improve the moldability (flowability) of the aromatic polyester and inhibit the orientation on molding, and as a result, found that this object can be attained by imparting a branched structure to the aromatic polyester. In other words, the case is that a branched structure is given to the aromatic polyester by simultaneous or gradual addition of polyfunctional materials on synthesizing the aromatic polyester. But, when as the polyfunctional material, for example tri-functional materials such as trimellitic acid or its anhydride, benzene-1,3,5-tricarboxylic acid, or derivatives thereof, and tetra-functional materials such as pyromellitic acid or its anhydride, benzophenone-3,4,3',4'-tetracarboxylic acid or its anhydride, or derivatives thereof, i.e. polycarboxylic compounds, are used, there is obtained an effect to inhibit the anisotropy, but the thermal stability becomes poor, so that the thermal resistance, one of the characteristics of the aromatic polyester, becomes poor which makes it impossible to use the aromatic polyester. Further, with pyrogallol and gallic acid, which are a tri- and tetra-functional compounds, respectively, there is a tendency that it is difficult for all the functional groups of the compounds to enter into reaction, or it is difficult to obtain aromatic polyesters having reproducible structure and physical property. As a result of a further study, the present inventors found that the problems shown above (moldability and anisotropy) can be solved without doing a great damage to the various properties characterizing the aromatic polyester including the present mechanical and thermal properties and others. Thus, the present inventors attained to the present invention.

According to the present invention, there is provided the following method: In a method for producing aromatic polyesters by the polycondensation of A: one or more compounds selected from aromatic hydroxy-carboxylic acids and their functional derivatives such as acylated or esterified compounds thereof, or A with B: one or more compounds selected from aromatic dicarboxylic acids and their functional derivatives such as esterified compounds or acid halides thereof and C: one or more compounds selected from aromatic diphenols and their functional derivatives such as acylated compounds thereof, a method for producing aromatic polyesters characterized in that, in said polycondensation, D: one or more compounds selected from the group consisting of 1,3,5-trihydroxybenzene, 3,5-dihydroxybenzoic acid, 5-hydroxyisophthalic acid and their functional derivatives such as acylated or esterified compounds thereof, are added to the reaction system in one portion or gradually, followed by bringing these compounds into reaction.

In polymerization, it is well known that, by copolymerizing a compound having three or more functional groups, a branched structure is given to the polymer, whereby the polymer acquires properties that polymers of linear structure lack. As described above, however, when a polycarboxylic compound is used, aromatic polyesters obtained by polymerization show a tendency to become poor in thermal stability, probably due to the residual unreacted carboxyl groups. When a compound is used in which the reactivity of the functional group is disturbed by steric hindrance, the effect is not sufficient or reproducibility is poor. Further, when aliphatic polyfunctional compounds such as glycerin, trimethylolethane, etc. are used, the thermal stability and thermal resistance of the resulting aromatic polyester come into question. As a result of a study with a series of these compounds, the present inventors found materials which have little steric hindrance, are rich in reactivity and produce polymers having a good thermal stability. Such materials are those of compound D, that is, a compound selected from the group consisting of 1,3,5-trihydroxybenzene (phloroglucin), 3,5-dihydroxybenzoic acid (5-carboxyresorcinol, α-resorcinolcarboxylic acid), 5-hydroxyisophthalic acid and their functional derivatives which are effective, and are thus the subject of the present invention.

As examples of functional derivatives among the compounds D, there may be given acylated or esterified compounds of the above compounds, such as, for example, 1,3,5-triacetoxybenzene, 1,3,5-tribenzoyloxybenzene, 3,5-diacetoxybenzoic acid, phenyl 3,5-dihydroxybenzoate, phenyl 3,5-diacetoxybenzoate and the like. That is, as an acyl group of the acylated compounds, there may be given an aliphatic, alicyclic or aromatic carbonyl group having 1-4 carbon atoms, and as an alcohol or phenol residue of the esterified compounds, there may be given aliphatic alcohol residues, alicyclic alcohol residues or aromatic phenol residues having 1-8 carbon atoms.

As the amount of the compound D added, amounts of 0.3 to 10 mole % based on the compound A are preferred when the aromatic polyester is obtained from the compound A alone, and amounts of 0.3 to 10 mole % based on the compound C are preferred when the aromatic polyester is obtained from the compounds A, B and C. When the amount exceeds the above range, crosslinking proceeds preferentially to make an improvement in moldability difficult, while when the amount is less than the above range, the effect is not clear.

As a polycondensation method for the aromatic polyester, solution polymerization, interfacial polymerization, suspension polymerization, bulk polymerization and the like are well known. But, because of the poor solubility of the polymer in organic solvents, suspension polymerization or bulk polymerization is preferred.

As examples of the compounds A, B and C used in the present invention, there may be given for example p-hydroxybenzoic acid, m-hydroxybenzoic acid, 2-hydroxy-6-naphthoic acid, 1-hydroxy-4-naphthoic acid, 1-hydroxy-5-naphthoic acid, 2-hydroxy-7-naphthoic acid, terephthalic acid, isophthalic acid, naphthalene-2,6-dicarboxylic acid, naphthalene-1,4-dicarboxylic acid, naphthalene-1,5-dicarboxylic acid, hydroquinone, resorcinol, 4,4'-dihydroxydiphenyl, 4,4'-dihydroxydiphenyl ether, 4,4'-dihydroxybenzophenone, 4,4'-dihydroxydiphenyl sulfone, 4,4'-dihydroxydiphenyl sulfide, 4,4'-dihydroxydiphenylmethane, 2,2-bis(4-hydroxyphenyl)propane, 2,6-naphthalenediol, 1,4-naphthalenediol, 1,5-naphthalenediol, these compounds having inactive substituents, and their functional derivatives.

As examples of functional derivatives among the compounds A, there may be given acylated or esterified compounds of aromatic hydroxycarboxylic acids, such as, for example, p-acetoxybenzoic acid, m-acetoxybenzoic acid, 1-propoxy-5-naphthoic acid, 2-acetoxy-6-naphthoic acid, phenyl p-hydroxybenzoate, tolyl m-hydroxybenzoate, n-butyl 1-hydroxy-5-naphthoate, isopropyl 2-hydroxy-6-naphthoate, p-benzoyloxybenzoic acid and the like. That is, as an acyl group of the acylated compounds, there may be given aliphatic, alicyclic or aromatic carbonyl group having 1-4 carbon atoms, and as an alcohol or phenol residue of the esterified compounds, there may be given aliphatic alcohol residues, alicyclic alcohol residues or aromatic phenol residues having 1-8 carbon atoms.

As examples of functional derivatives among the compounds B, there may be given esterified compounds or acid halides of aromatic dicarboxylic acids, such as for example, diphenyl terephthalate, diphenyl isophthalate, 1,4-naphthalenedicarboxylic acid diphenyl ester, 2,6-naphthalenedicarboxylic acid diphenyl ester, dimethyl terephthalate, dimethyl isophthalate, terephthaloyl chloride, isophthaloyl chloride, 2,6-naphthalenedicarboxyl dichloride and the like. That is, as an alcohol or phenol residue of the esterified compounds, there may be given aliphatic alcohol residues, alicyclic alcohol residues or aromatic phenol residues having 1-8 carbon atoms, and as a halogen atom of the acid halides, there may be given chlorine, bromine, fluorine or iodine atom.

As examples of functional derivatives among the compounds C, there may be given acylated compounds of aromatic diphenols, such as, for example, 1,4-diacetoxybenzene, 1,3-diacetoxybenzene, 4,4'-diacetoxydiphenyl, 4,4'-diacetoxydiphenyl ether, 4,4'-diacetoxybenzophenone, 4,4'-diacetoxydiphenyl sulfide, 4,4'-diacetoxydiphenyl methane, 2,2-bis(4-acetoxyphenyl)-propane, 1,4-diacetoxynaphthalene, 2,6-diacetoxynaphthalene, 1,5-diacetoxynaphthalene, 1,4-dibenzoyloxybenzene, 4,4'-dibenzoyloxydiphenyl and the like. That is, as an acyl group of the acylated compounds, there may be given an aliphatic, alicyclic or aromatic carbonyl group having 1-4 carbon atoms. By combining the above compounds A, B and C with the compound D, the objective aromatic polyester can be derived therefrom. In the compounds A, B, C and D, it is preferred that the functional groups, which form —O— and —CO— bonds when the compounds are polycondensed, are not present in adjacent positions on the atomatic nucleus.

A method of how to use the compound D may be any of those in which D and the compound A, or D and the compounds A, B and C are simultaneously brought into polycondensation, and in which D is previously reacted with one of A, B and C, followed by polymerizing the whole. Also, a method in which D is gradually added to the polymerization system before the polymerization comes to an end, may be thought of.

The polymerization, when either suspension polymerization or bulk polymerization is employed, is preferably carried out at 200° to 400° C., preferably 250° to 350° C. under normal or reduced pressure in an inert gas atmosphere. It is also possible to advance the polymerization using a catalyst of which the residue has no adverse effect on the physical properties of the aromatic polyester obtained, or which loses the activity by simple treatment.

The aromatic polyester thus obtained is a polymer superior in moldability as well as thermal resistance, mechanical properties and the like. The aromatic polyester obtained by the present invention can sufficiently satisfy mechanical properties and other physical ones even if blended with no fillers, but as the need arises, it may be blended with stabilizers, coloring agents and various fillers so far as the characteristics of the polymer are not damaged. As the filler, there may be given for example inorganic materials such as silica, powdered quartz, sand, fumed silica, silicon carbide, aluminum oxide, glass fiber, tin oxide, iron oxide, zinc oxide, carbon, graphite, titanium dioxide, etc., and heat-resistant organic pigments.

The present invention will be illustrated with reference to the following examples and comparative examples, which are however given for the purpose of illustration and are not to be interpreted as limiting the present invention.

EXAMPLE 1

To a polymerization vessel having an anchorform mixing blade with a small clearance between the blade and its internal wall surface, were added 910.8 g (6.6 moles) of p-hydroxybenzoic acid, 547.8 g (3.3 moles) of terephthalic acid, 606.4 g (3.26 moles) of 4,4'-dihydroxydiphenyl, 5.0 g (0.04 mole) of 1,3,5-trihydroxybenzene and 1,485 g (14.56 moles) of acetic anhydride. The resulting mixture, with stirring in a nitrogen atmosphere, was heated to 150° C. and refluxed for 3 hours at this temperature. Thereafter, while raising the temperature, acetic acid resulting from reaction was distilled off, and the temperature was finally raised to 310° C. under high shear. The polymerization was continued for another two hours with powerful stirring, and the reaction mixture was then cooled to 200° C. to obtain 1,736 g (94.6%) of a polymer.

The polymer was pulverized so as to pass through a 0.5 mm-mesh screen and transferred to aluminum rotary oven. Thereafter, while rotating the whole system in a nitrogen stream and thoroughly stirring the powder, the powder was heated to 330° C. over 6 hours, treated at 330° C. for 3 hours, cooled and taken out at 200° C.

This polymer was granulated on a single-screw extruder VS-30-28 (screw diameter, 30 mm; L/D, 28; produced by Tanabe Plastic Machinery Co.) under a condition that the cylinder temperature be 350° C. and the number of rotations of the screw be 50 rpm, and then injection-molded on Neomat N 47/28 (injection molding machine produced by Sumitomo Shipbuilding & Machinery Co.). Various test pieces were molded, and the values of the respective physical properties were measured.

The result is shown in Table 1. The surface roughness of the molded product by orientation is inhibited, and the appearance is also smooth. Processability on molding is also good, this being apparent from the large strength of the welded part.

Hereupon, as a mold for the evaluation of welded parts, there was used a window frame-form mold having its gate at the center so as to produce welded parts, and the molded product produced by it was 3 mm in thickness, 12.5 mm in width and 64 mm in the outside length of each side.

The results of Examples 2, 3 and 4 and Comparative Example 1 are also shown in Table 1.

EXAMPLES 2, 3 and 4

The results of the systems wherein the amounts of 1,3,5-trihydroxybenzene are 0.5 mole %, 3 mole % and 6 mole %, respectively, based on the total amount of 1,3,5-trihydroxybenzene and 4,4'-dihydroxydiphenyl, are shown in Table 1.

COMPARATIVE EXAMPLE 1

The result of the system containing no 1,3,5-trihydroxybenzene is shown in Table 1. The orientation of the molded product is large, the welding of parts to be welded being difficult, so that the strength of the welded part is also small.

TABLE 1

| | Amount of 1,3,5-trihydroxy benzene (mole %) | Molding temperature (°C.) | Appearance of molded product | Tensile strength (kg/cm$^2$) | Tensile modulus ($\times 10^{-4}$ kg/cm$^2$) | Bending strength of welded part (kg/cm$^2$) |
|---|---|---|---|---|---|---|
| Example 2 | 0.5 | 360 | Good | 1100 | 3.7 | 290 |
| | | 380 | " | 1150 | 3.8 | 320 |
| Example 1 | 1.2 | 360 | Good | 900 | 3.5 | 360 |
| | | 380 | " | 980 | 3.5 | 340 |
| Example 3 | 3.0 | 370 | Good | 780 | 3.1 | 380 |
| | | 390 | " | 820 | 3.0 | 400 |
| Example 4 | 6.0 | 370 | Good | 720 | 2.9 | 350 |
| | | 390 | " | 680 | 3.2 | 300 |
| Comparative Example 1 | 0 | 360 | Large surface roughness | 1370 | 4.1 | 55 |
| | | 380 | Large surface roughness | 1550 | 4.4 | 70 |

COMPARATIVE EXAMPLE 2

Using the same apparatus as used in Example 1, 910.8 g (6.6 moles) of p-hydroxybenzoic acid, 531.2 g (3.2 moles) of terephthalic acid, 613.8 g (3.3 moles) of 4,4'-dihydroxydiphenyl, 19.2 g (0.1 mole) of trimellitic anhydride and 1,485 g (14.56 moles) of acetic anhydride were added to the apparatus and treated in the same manner as in Example 1 to obtain 1,741 g (97.9 %) of a polymer. Thereafter, the polymer was heat-treated, granulated and molded in the same manner. With a molding temperature of 390° C., the tensile strength was 1,210 kg/cm$^2$; tensile modulus, 3.9 $\times$ 10$^4$ kg/cm$^2$; and bending strength of the welded part was 120 kg/cm$^2$. It can be seen from this result that the bending strength shows a somewhat improved value as compared with Comparative Example 1, but that the effect is small as compared with Examples 1, 2, 3 and 4.

EXAMPLE 5

Using the following feed condition, a polymer was synthesized in the same manner as in Example 1: p-Hydroxybenzoic acid, 910.8 g (6.6 moles); terephthalic acid, 547.8 g (3.3 moles); 4,4'-dihydroxydiphenyl, 606.4 g (3.26 moles); 3,5-dihydroxybenzoic acid, 12.32 g (0.08 mole; 1 mole %, as phenol, based on 4,4'-dihydroxydiphenyl); and acetic anhydride, 1,485 g (14.56 moles).

On producing a molded product by the same treatment and molding, it was found that the surface roughness by orientation was inhibited and the appearance was also good as compared with a case wherein 3,5-dihydroxybenzoic acid was not added, and that the molded product obtained at 390° C. had well-balanced physical properties as shown by a tensile strength of 1,030 kg/cm$^2$, tensile modulus of 3.7×10$^4$ kg/cm$^2$ and a bending strength of welded part of 380 kg/cm$^2$.

COMPARATIVE EXAMPLE 3

In order to examine the effect of pyrogallol triacetate as used in EXAMPLES of U.S. Pat. No. 4,417,043, the following experiment was carried out:

The polymerization was carried out according to the method of Example 1 except that 5.0 g (0.04 mole) of pyrogallol (1,2,3-trihydroxybenzene) was used in place of the 1,3,5-trihydroxybenzene to evaluate the obtained polymer by the molded product as in Example 1. In this case, the pyrogallol was allowed to react with the acetic anhydride to form pyrogallol triacetate as a transient intermediate. The injection molding was carried out at 360° C., the appearance of molded product showed silver streaks caused by molecular orientation, the heat stability was poor compared with that of no incorporation of the pyrogallol, and outgassing was observed during the molding.

Tensile strength, tensile modulus and bending strength of welded part of the molded product were 1350 kg/cm$^2$, 4.1×10$^4$ kg/cm$^2$ and 58 kg/cm$^2$, respectively, and accordingly, no effect of the pyrogallol triacetate was observed.

What is claimed is:

1. In a method for producing aromatic polyesters by the polycondesation of

A: one or more compounds selected from the group consisting of aromatic hydroxy-carboxylic acids and acylated or esterified compounds thereof, or A with B: one or more compounds selected from the group consisting of aromatic dicarboxylic acids and esterified compounds or acid halides thereof and C: one or more compounds selected from the group consisting of aromatic diphenols and acylated compounds thereof, a the improvement comprising adding to the reaction system, either in bulk, or gradually during polycondensation D: one or more compounds selected from the group consisting of 1,3,5-trihydroxybenzene, 3,5-dihydroxybenzoic acid, 5-hydroxyisophthalic acid and acylated or esterified compounds thereof, whereby D is included in the reaction.

2. A method for producing aromatic polyesters according to claim 1, wherein the amount of the compound D is 0.3 to 10 mole % based on the compound A when the aromatic polyester comprises the compound A alone, and said amount is 0.3 to 10 mole % based on the compound C when the aromatic polyester is obtained from the compounds comprising A, B and C.

3. A method for producing aromatic polyesters according to claim 1, wherein the compound A is a compound selected from the group consisting of p-hydroxybenzoic acid, m-hydroxybenzoic acid, 1-hydroxy-5-naphthoic acid, 2-hydroxy-6-naphthoic acid, 1-hydroxy-4-naphthoic acid and acylated or esterified compounds thereof, the compound B is a compound selected from the group consisting of terephthalic acid, isophthalic acid, naphthalene-1,4-dicarboxylic acid, naphthalene-1,5-dicarboxylic acid, nahthalene-2,6-dicarboxylic acid and esterified compounds or acid halides thereof, the compound C is a compound selected from the group consisting of hydroquinone, resorcinol, 4,4'-dihydroxydiphenyl, 4,4'-dihydroxydiphenyl ether, 4,4'-dihydroxydiphenyl sulfone, 4,4'dihydroxybenzophenone, 4,4'-dihydroxydiphenyl sulfide, 4,4'-dihydroxydiphenylmethane, 2,2-bis(4-hydroxyphenyl)propane, 1,4-dihydroxynaphthalene, 1,5-dihydroxynaphthalene, 2,6-dihydroxynaphthalene and acylated compounds thereof, and the compound D is a compound selected from the group consisting of 1,3,5-trihydroxybenzene, 5-carboxyresorcinol, 5-hydroxyisophthalic acid and acylated or esterified compounds thereof.

4. A method for producing aromatic polyesters according to claim 1, wherein, the compounds A, B, C and D are employed in the molar ratio of A to B of between 10:1 and 1:10 and that of B to C is between 10:9 and 9:10.

5. A method for producing aromatic polyesters according to claim 2, wherein the compound A is a compound selected from the group consisting of p-hydroxybenzoic acid, m-hydroxybenzoic acid, 1-hydroxy-5-naphthoic acid, 2-hydroxy-6-naphthoic acid, 1-hydroxy-4-naphthoic acid and acylated or esterified compounds thereof, the compound B is a compound selected from the group consisting of terephthalic acid, isophthalic acid, naphthalene-1,4-dicarboxylic acid, naphthalene-1,5-dicarboxylic acid, naphthalene-2,6-dicarboxylic acid and esterified compounds or acid halides thereof, the compound C is a compound selected from the group consisting of hydroquinone, resorcinol, 4,4'-dihydroxydiphenyl, 4,4'-dihydroxydiphenyl ether, 4,4'-dihydroxydiphenyl sulfone, 4,4'-dihydroxybenzophenone, 4,4'-dihydroxydiphenyl sulfide, 4,4'-dihydroxydiphenylmethane, 2,2-bis(4-hydroxyphenyl)propane, 1,4-dihydroxynaphthalene, 1,5-dihydroxynaphthalene, 2,6-dihydroxynaphthalene and acylated compounds thereof, and the compound D is a compound selected from the group consisting of 1,3,5-trihydroxybenzene, 5-carboxyresorcinol, 5-hydroxyisophthalic acid and acylated or esterified compounds thereof.

* * * * *